United States Patent
Kohso et al.

(10) Patent No.: US 12,275,465 B2
(45) Date of Patent: *Apr. 15, 2025

(54) ELECTRIC POWER STEERING CONTROL DEVICE AND ELECTRIC POWER STEERING DEVICE

(71) Applicant: Hitachi Astemo, Ltd., Hitachinaka (JP)

(72) Inventors: Miki Kohso, Hitachinaka (JP); Kosuke Sano, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 103 days.

This patent is subject to a terminal disclaimer.

(21) Appl. No.: 18/053,947

(22) Filed: Nov. 9, 2022

(65) Prior Publication Data

US 2023/0067219 A1    Mar. 2, 2023

Related U.S. Application Data

(63) Continuation of application No. PCT/JP2020/022245, filed on Jun. 5, 2020.

(30) Foreign Application Priority Data

Jun. 2, 2020   (JP) .................... 2020-096143

(51) Int. Cl.
B62D 5/04    (2006.01)

(52) U.S. Cl.
CPC ................ B62D 5/0457 (2013.01)

(58) Field of Classification Search
CPC ..... B62D 5/0457; B62D 5/0463; B62D 6/008
(Continued)

(56) References Cited

U.S. PATENT DOCUMENTS 6,184,637 B1    2/2001  Yamawaki et al.
11,891,130 B2*  2/2024  Minakawa ........... B62D 5/0463
(Continued)

FOREIGN PATENT DOCUMENTS

DE    19805737 A1    8/1998
DE    19951548 B4    11/2006
(Continued)

OTHER PUBLICATIONS

International Search Report mailed Jul. 28, 2020 for the corresponding International Patent Application No. PCT/JP2020/022245 (5 pages including English translation).

(Continued)

*Primary Examiner* — Hai H Huynh
(74) *Attorney, Agent, or Firm* — Leason Ellis LLP; Edward J. Ellis; Melvin C. Garner

(57) ABSTRACT

Provided is a feature capable of improving steering sensation in an electric power steering control device. This electric power steering control device is provided with: a basic control amount calculation unit that calculates a basic control amount corresponding to driver's steering; a friction force calculation unit that calculates, by using a friction model, a friction force corresponding to at least one of a yaw rate and lateral acceleration, and calculates a friction-caused control amount resulting from the calculated friction force; and a control amount calculation unit that calculates a steering control amount in accordance with the basic control amount and the friction-caused control amount.

20 Claims, 9 Drawing Sheets

(58) Field of Classification Search
USPC .......................................... 701/41, 42, 43, 44
See application file for complete search history.

(56) References Cited

U.S. PATENT DOCUMENTS

| | | | |
|---|---|---|---|
| 11,993,327 B2* | 5/2024 | Baudouin | ............ B62D 5/0481 |
| 2010/0228440 A1 | 9/2010 | Yamazaki | |
| 2012/0232759 A1 | 9/2012 | Oniwa et al. | |
| 2020/0231204 A1 | 7/2020 | Isshiki et al. | |
| 2022/0032995 A1 | 2/2022 | Minakawa et al. | |

FOREIGN PATENT DOCUMENTS

| | | |
|---|---|---|
| DE | 112018006594 T5 | 10/2020 |
| DE | 112019007340 T5 | 1/2022 |
| JP | 2009126244 A | 6/2009 |
| WO | 2011062145 A1 | 5/2011 |

OTHER PUBLICATIONS

German Office Action mailed Feb. 26, 2025 for the corresponding German Patent Application No. 112020006891.9 (9 pages including English translation).

* cited by examiner

ELECTRIC POWER STEERING CONTROL DEVICE AND ELECTRIC POWER STEERING DEVICE

CROSS REFERENCE TO RELATED APPLICATIONS

This application is a Continuation of International Patent Application No. PCT/JP2020/022245 filed on Jun. 5, 2020, which claims the benefit of priority to Japanese Patent Application No. 2020-096143 filed on Jun. 2, 2020, the contents of all of which are incorporated herein by reference in their entireties.

FIELD OF THE INVENTION

The present invention relates to an electric power steering control device and an electric power steering device that control steering.

BACKGROUND OF THE INVENTION

In the related art, steering devices that assist a steering operation by rotation of an electric motor are known (for example, Patent Literatures 1 and 2). In these steering devices, a current value of the motor is controlled such that an appropriate friction torque is applied to the steering device according to a vehicle speed and a steering angle.

Patent Literature 1: JP 2009-126244 A (published on Jun. 11, 2009)

Patent Literature 2: WO 2011/062145 (published on May 26, 2011)

SUMMARY OF THE INVENTION

In an electric power steering control device, it is preferable to improve the steering feeling.

An object of the present invention is to provide a technique capable of improving the steering feeling in the electric power steering control device.

Based on this object, the present invention provides an electric power steering control device for calculating a steering control amount for steering a steering device. The electric power steering control device includes: a basic control amount calculation unit configured to calculate a basic control amount in accordance with steering by a driver; a friction force calculation unit configured to calculate a friction force in accordance with at least one of a yaw rate and lateral acceleration using a friction model, and calculate a friction-caused control amount caused by the calculated friction force; and a control amount calculation unit configured to calculate the steering control amount according to the basic control amount and the friction-caused control amount calculated by the friction force calculation unit.

According to the present invention, the steering feeling can be improved in the electric power steering device.

DETAILED DESCRIPTION OF THE INVENTION

First Embodiment

Hereinafter, a first embodiment of the present invention will be described in detail.

(Configuration of Vehicle 900)

Figure 1:
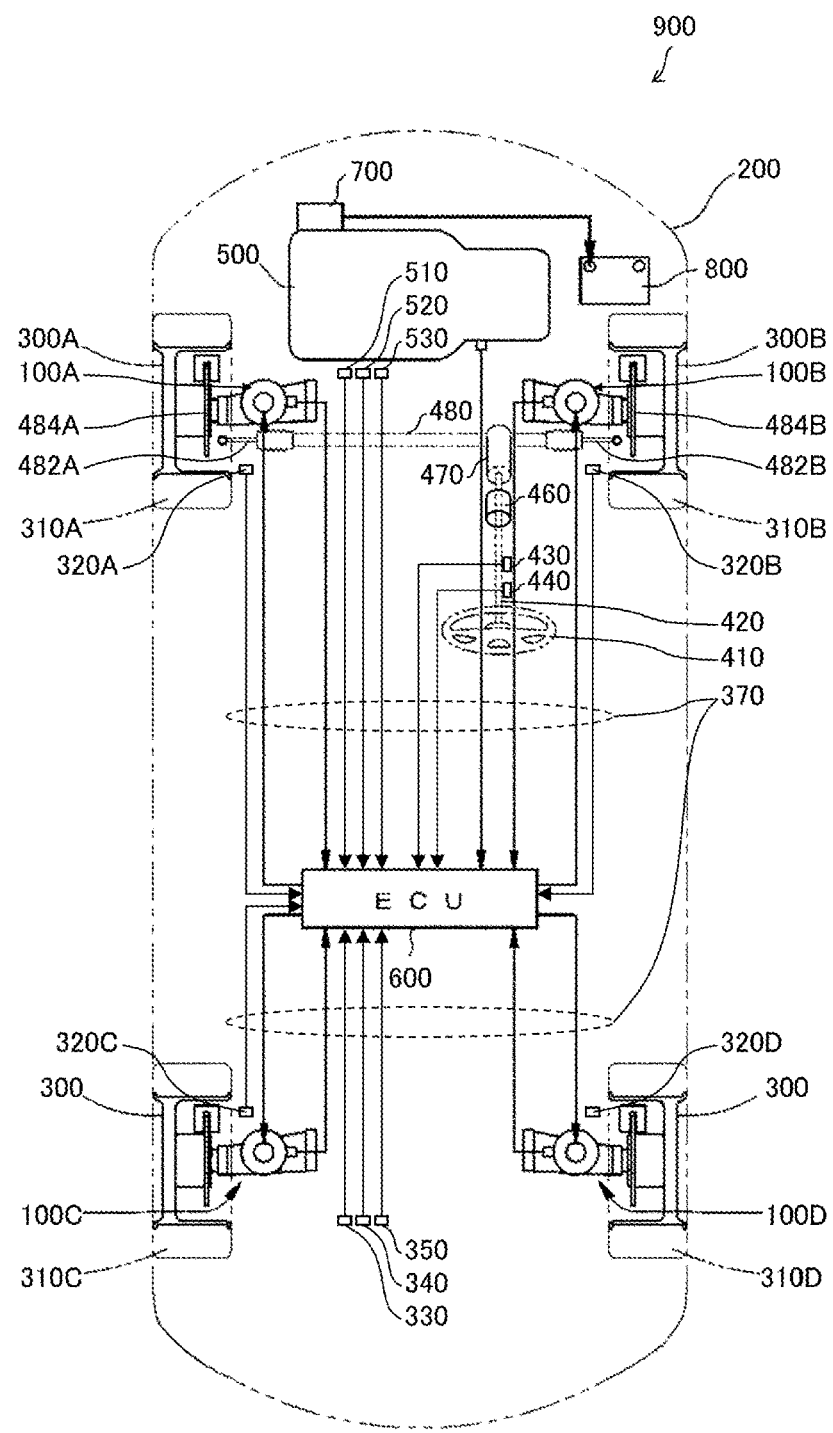
FIG. 1 is a diagram showing a schematic configuration of a vehicle according to a first embodiment of the present invention.

FIG. 1 is a diagram showing a schematic configuration of a vehicle 900 according to the present embodiment. As shown in FIG. 1, the vehicle 900 includes a suspension device (suspension) 100, a vehicle body 200, a wheel 300, a tire 310, a steering member 410, a steering shaft 420, a torque sensor 430, a steering angle sensor 440, a torque application unit 460, a rack-and-pinion mechanism 470, a rack shaft 480, an engine 500, an electronic control unit (ECU) (control device, control unit) 600, a power generating device 700, and a battery 800. Here, the suspension device 100 and the ECU 600 constitute the suspension device according to the present embodiment.

The steering member 410, the steering shaft 420, the torque sensor 430, the steering angle sensor 440, the torque application unit 460, the rack-and-pinion mechanism 470, the rack shaft 480, and the ECU 600 constitute an electric power steering device according to the present embodiment. The ECU 600 includes an electric power steering control device that controls a steering device of the vehicle 900 based on the electric power steering device.

The wheel 300 on which the tire 310 is mounted is suspended from the vehicle body 200 by the suspension device 100. Since the vehicle 900 is a four-wheeled vehicle, four suspension devices 100, four wheels 300, and four tires 310 are provided.

The tire and wheel on a left front side, the tire and wheel on a right front side, the tire and wheel on a left rear side, and the tire and wheel on a right rear side are also referred to as a tire 310A and a wheel 300A, a tire 310B and a wheel 300B, a tire 310C and a wheel 300C, and a tire 310D and a wheel 300D, respectively. Hereinafter, similarly, configurations associated with the left front side, the right front side, the left rear side, and the right rear side may be denoted by reference numerals "A", "B", "C", and "D", respectively.

The suspension device 100 includes a hydraulic shock absorption device, an upper arm, and a lower arm. For example, the hydraulic shock absorption includes a solenoid valve that is an electromagnetic valve that adjusts a damping force generated by the hydraulic shock absorption device. However, this does not limit the present embodiment, and the hydraulic shock absorption device may use an electromagnetic valve other than the solenoid valve as the electromagnetic valve for adjusting the damping force. For example, as the electromagnetic valve, an electromagnetic valve using an electromagnetic fluid (magnetic fluid) may be used.

The power generating device 700 is attached to the engine 500, and electric power generated by the power generating device 700 is stored in the battery 800.

The steering member 410 operated by a driver is connected to one end of the steering shaft 420 such that torque can be transmitted, and the other end of the steering shaft 420 is connected to the rack-and-pinion mechanism 470.

The rack-and-pinion mechanism 470 is a mechanism for converting rotation around an axis of the steering shaft 420 into displacement along an axial direction of the rack shaft 480. When the rack shaft 480 is displaced in the axial direction, the wheels 300 (300A, 300B) are steered via tie rods 482 (482A, 482B) and knuckle bars 484 (484A, 484B).

The torque sensor 430 detects a steering torque applied to the steering shaft 420, in other words, a steering torque applied to the steering member 410, and provides a torque sensor signal indicating the detection result to the ECU 600. More specifically, the torque sensor 430 detects twisting of a torsion bar provided in the steering shaft 420, and outputs the detection result as a torque sensor signal. A known sensor such as a Hall IC, an MR element, or a magnetostrictive torque sensor may be used as the torque sensor 430.

The steering angle sensor 440 detects a steering angle of the steering member 410 and provides the detection result to the ECU 600.

The torque application unit 460 applies, to the steering shaft 420, an assist torque or a counter force torque in accordance with a steering control amount supplied from the ECU 600. The torque application unit 460 includes an assist motor 620 that generates the assist torque or the counter force torque in accordance with the steering control amount (also referred to as a motor control amount), and a torque transmission mechanism that transmits the torque generated by the assist motor 620 to the steering shaft 420. The torque application unit 460 includes a motor rotation speed sensor that detects a rotation speed of the assist motor 620, and a resolver 625 that is a motor rotation angle sensor that detects a rotation angle of the assist motor.

Specific examples of the "control amount" in the present description include a current value, a duty ratio, a damping rate, a damping ratio, and the like.

In the above description, "connected . . . such that torque can be transmitted" means that members are connected with each other such that rotation of one member causes the rotation of the other member, and at least includes, for example, a case where the one member and the other member are integrally formed, a case where the one member is directly or indirectly fixed to the other member, and a case where the one member and the other member are connected so as to be interlocked with each other via a joint member or the like.

Further, in the above example, a steering device in which the steering member 410 to the rack shaft 480 are always mechanically connected is taken as an example, but this does not limit the present embodiment, and the steering device according to the present embodiment may be, for example, a steer-by-wire steering device. Matters described below in the present description can also be applied to the steer-by-wire steering device.

In FIG. 1, a column-assist type steering device in which a torque application unit is provided on a steering shaft is shown, but this does not limit the present embodiment. A rack-assist type steering device in which the torque application unit is provided on a rack shaft may be used.

The ECU 600 integrally controls various electronic devices provided in the vehicle 900. More specifically, the ECU 600 controls the magnitude of the assist torque or the counter force torque applied to the steering shaft 420 by adjusting the steering control amount supplied to the torque application unit 460.

The ECU 600 controls opening and closing of the solenoid valve provided in the hydraulic shock absorption device included in the suspension device 100 by supplying a suspension control amount to the solenoid valve. In order to enable this control, a power line is provided for supplying driving power from the ECU 600 to the solenoid valve.

The vehicle 900 includes a wheel speed sensor 320 that is provided for each of the wheels 300 and detects a wheel speed of each of the wheels 300, a lateral G sensor 330 that detects lateral acceleration of the vehicle 900, a longitudinal G sensor 340 that detects longitudinal acceleration of the vehicle 900, a yaw rate sensor 350 that detects a yaw rate of the vehicle 900, an engine torque sensor 510 that detects the torque generated by the engine 500, an engine rotation number sensor 520 that detects a rotation number of the engine 500, and a brake pressure sensor 530 that detects the pressure applied to a brake fluid of a brake device. Detection results of these various sensors are supplied to the ECU 600.

Although not illustrated, the vehicle 900 includes a brake device that can be controlled by an antilock brake system (ABS) that is a system for preventing wheel lock during braking, a traction control system (TCS) that prevents wheel idling during acceleration or the like, and a vehicle stability assist (VSA) that is a vehicle behavior stabilization control system having an automatic brake function for yaw moment control, a brake assist function, and the like during turning.

Here, the ABS, the TCS, and the VSA compare a wheel speed determined according to an estimated vehicle body speed with a wheel speed detected by the wheel speed sensor 320, and determine that a vehicle is in a slip state when values of the two wheel speeds are different from each other by a predetermined value or more. Through such processing, the ABS, the TCS, and the VSA stabilize the behavior of the vehicle 900 by performing optimal brake control and traction control according to a traveling state of the vehicle 900.

The supply of the detection results by the various sensors to the ECU 600 and the transmission of control signals from the ECU 600 to the respective units are performed via a controller area network (CAN) 370.

The signals supplied to the ECU 600 via the CAN 370 includes, for example, the following signals (acquisition sources are shown in parentheses).

- wheel speed of four wheels (wheel speed sensors 320A to 320D)
- yaw rate (yaw rate sensor 350)
- longitudinal G (longitudinal G sensor 340)
- lateral G (lateral G sensor 330)
- brake pressure (brake pressure sensor 530)
- engine torque (engine torque sensor 510)
- engine rotation number (engine rotation number sensor 520)
- steering angle (steering angle sensor 440)
- steering torque (torque sensor 430)

Figure 2:
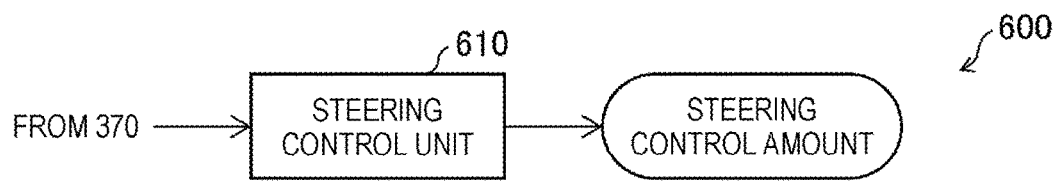
FIG. 2 is a block diagram showing a schematic configuration of an ECU according to the first embodiment of the present invention.

FIG. 2 is a diagram showing a schematic configuration of the ECU 600.

As shown in FIG. 2, the ECU 600 includes a steering control unit (steering control device) 610.

The steering control unit 610 determines the magnitude of the steering control amount to be supplied to the torque application unit 460 with reference to various sensor detection results included in the CAN 370.

In the present description, the expression "with reference to" may include the meaning of "using", "considering", "depending on", and the like.

The process of "determining the magnitude of the control amount" includes a case where the magnitude of the control amount is set to zero, that is, the control amount is not supplied.

(Steering Control Unit)

Figure 3:
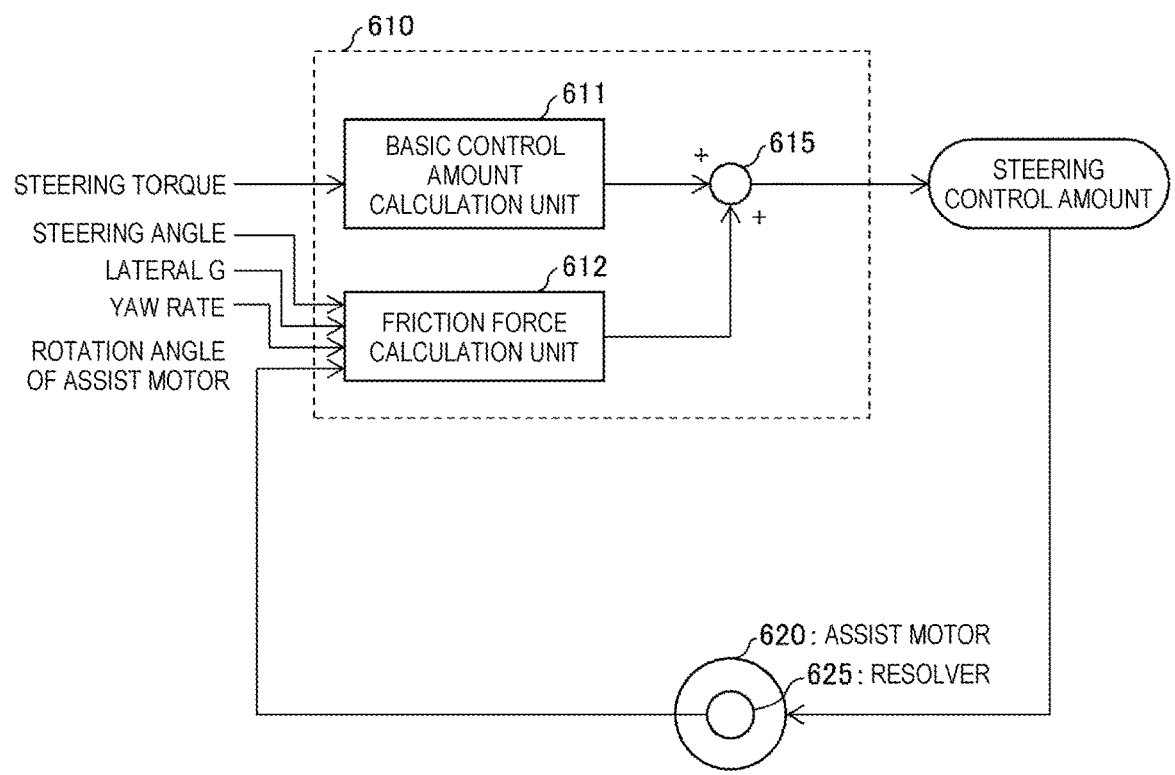
FIG. 3 is a block diagram showing a configuration example of a steering control unit according to the first embodiment of the present invention.

Next, the steering control unit 610 will be described in more detail with reference to FIG. 3. Here, the steering control unit 610 of the present embodiment is an example of a steering control device described in the claims. FIG. 3 is a block diagram showing a configuration example of the steering control unit 610.

As shown in FIG. 3, the steering control unit 610 includes a basic control amount calculation unit 611, a friction force calculation unit 612, and an addition unit 615. Here, the addition unit 615 is an example of a control amount calculation unit described in the claims. In the present embodiment, the basic control amount calculation unit 611, the friction force calculation unit 612, and the addition unit 615 are collectively referred to as a steering control amount calculation unit that calculates the steering control amount. The steering control amount calculation unit calculates the steering control amount according to a basic control amount calculated by the basic control amount calculation unit 611 and a friction-caused control amount calculated by the friction force calculation unit 612.

The basic control amount calculation unit 611 refers to the steering torque supplied from the torque sensor 430, and calculates the basic control amount which is in accordance with the steering of a driver and is for controlling the magnitude of the assist torque or the counter force torque.

The friction force calculation unit 612 calculates a friction force in accordance with at least one of the yaw rate supplied from the yaw rate sensor 350 and the lateral G (lateral acceleration) supplied from the lateral G sensor 330 using a friction model. The friction force calculation unit 612 calculates a friction-caused control amount caused by the calculated friction force. The friction force calculation unit 612 may be configured to calculate, using a friction model, a friction-caused control amount further in accordance with a steering angle-related value, which is a value related to a steering angle of the steering device in addition to the yaw rate and the lateral acceleration. The friction force calculation unit 612 supplies the calculated friction-caused control amount to the addition unit 615.

The addition unit 615 calculates the steering control amount by adding the friction-caused control amount calculated by the friction force calculation unit 612 to the basic control amount calculated by the basic control amount calculation unit 611. The steering control amount calculated by the addition unit 615 is supplied to the assist motor 620 of the torque application unit 460.

Here, the steering angle-related value has two values, a steering angle-related value on a steering member side using a value on the steering member 410 side via the torsion bar provided inside the steering shaft 420, and a steering angle-related value on a gear box side using a value on the gear box side including the rack-and-pinion mechanism 470. The friction force calculation unit 612 calculates the friction force using one of the two values.

Here, the friction force can be more appropriately calculated by using the rotation angle of the assist motor 620, which is one of the steering angle-related values on the gear box side having a large amount of friction, between the steering angle-related values. Here, the assist motor 620 is an electric motor that applies the assist torque or the counter force torque to the steering device based on the steering control amount.

For example, the friction force calculation unit 612 acquires a rotation angle signal indicating the rotation angle of the assist motor 620 from the resolver 625, calculates a rack position with reference to the acquired rotation angle signal, and calculates a friction force in accordance with the calculated rack position using a friction model.

The rotation angle signal indicating the rotation angle of the assist motor 620 output from the resolver 625 has high resolution. Therefore, by calculating the friction force using the output from the resolver 625 having high resolution, the friction force calculation unit 612 can more precisely calculate the friction-caused control amount caused by the friction force. By calculating a rack displacement using the assist motor 620 in a region where the rack displacement is small, the rack displacement can be estimated with higher accuracy.

As described above, since the rotation angle of the assist motor 620 output from the resolver 625 has affinity for the friction model, the friction force calculation unit 612 can more appropriately calculate the friction-caused control amount causes by the friction force by a synergistic effect obtained by using the rotation angle of the assist motor 620 and the friction model.

(Friction Force Calculation Unit)

The friction force calculation unit 612 determines, according to the magnitude of the steering angle supplied from the steering angle sensor 440, a friction model for calculating the friction force. For example, the friction force calculation unit 612 calculates the friction force using friction models based on the following expressions.

When $-a < \theta < a$ (first range): $F = f(d)$

When $a \leq \theta < b$ or $-b < \theta \leq -a$ (second range): $F = f(Y) + \alpha$ When $b \leq \theta$ or $\theta \leq -b$ (third range): $F = f(a_c) + \alpha + \beta$ Where $\theta$: steering angle F: friction force
d: rack displacement
Y: yaw rate
$a_y$: lateral acceleration
α and β: any constants f( ) represents a function. a and b are any constants that satisfy the relation of a<b. α is, for example, a maximum value of the friction force to be calculated by F=f(d), and β is, for example, a maximum value of the friction force to be calculated by F=f(Y). As the steering angle θ used here, a pinion angle, the rack position, the steering angle, or the like can be used. The first range, the second range, and the third range are set to increase stepwise in the order of the first range, the second range, and the third range in a range region of the steering angle θ.

As described above, when the steering angle is within the first range, the friction force calculation unit 612 calculates the friction-caused control amount caused by a friction force in accordance with the rack displacement by using the friction model in accordance with the rack displacement. Here, the first range is, for example, a range related to a fine steering range in which the steering member 410 is finely steered.

When the steering angle is within the second range, the friction force calculation unit 612 calculates the friction-caused control amount caused by the friction force in accordance with the yaw rate by using the friction model in accordance with the yaw rate. In this friction model, since the friction-caused control amount is calculated in accordance with a value of the yaw rate, it is possible to control a friction characteristic in consideration of a vehicle condition. In the friction force within the second range, by adding the maximum value of the friction force calculated by F=F(d) as a constant, it is possible to make the connection of a friction force curve linear when the first range is shifted to the second range. As a result, it is possible to realize a sense of unity between the flow of vehicle steering by the driver and a change in the vehicle condition.

When the steering angle is within the third range, the friction force calculation unit 612 calculates the friction-caused control amount caused by the friction force in accordance with the lateral acceleration by using the friction model in accordance with the lateral acceleration. In this friction model, since the friction-caused control amount is calculated in accordance with a value of the lateral acceleration, it is possible to control the friction characteristic in consideration of the vehicle condition. In the friction force within the third range, by adding the maximum value of the friction force calculated by F=F(d) and the maximum value of the friction force calculated by F=f(Y) as constants, it is possible to make the connection of the friction force curve linear when the second range is shifted to the third range. Accordingly, it is possible to realize a sense of unity between the flow of vehicle steering by the driver and the change in the vehicle condition.

In the friction force calculation unit 612 described above, the configuration has been described in which the friction-caused control amount is calculated in a friction force model according to the value of any one of the friction force in accordance with the yaw rate and the friction force in accordance with the lateral acceleration, and the invention described in the present description is not limited thereto. The friction force calculation unit 612 in the present embodiment may be configured to use a friction model that calculates the friction-caused control amount according to both values of the friction force in accordance with the yaw rate and the friction force in accordance with the lateral acceleration. The friction force calculation unit 612 in the present embodiment may be configured to use a friction model that calculates the friction-caused control amount according to values of the friction force in accordance with the steering angle-related value and the friction force in accordance with the yaw rate. The friction force calculation unit 612 in the present embodiment may be configured to use a friction model that calculates the friction-caused control amount according to values of the friction force in accordance with the steering angle-related value and the friction force in accordance with the lateral acceleration.

In the friction force calculation unit 612 described above, the configuration in which the friction model to be referred to is switched according to the magnitude of the steering angle has been described, and the invention described in the present description is not limited thereto. The friction force calculation unit 612 in the present embodiment may be configured to switch the friction model according to the rack displacement and the steering angle-related value such as the steering angle of the steering member 410.

The present inventors have found that, as the steering angle increases, the state quantity affecting the driving feeling of the driver changes in the order of the steering angle-related value, the yaw rate, and the lateral acceleration. Therefore, in the present invention, by switching the configuration used to calculate the friction-caused control amount in the order of the steering angle-related value, the yaw rate, and the lateral acceleration according to the steering angle region, it is possible to implement control that provides a more comfortable driving feeling for the driver.

Figure 4:
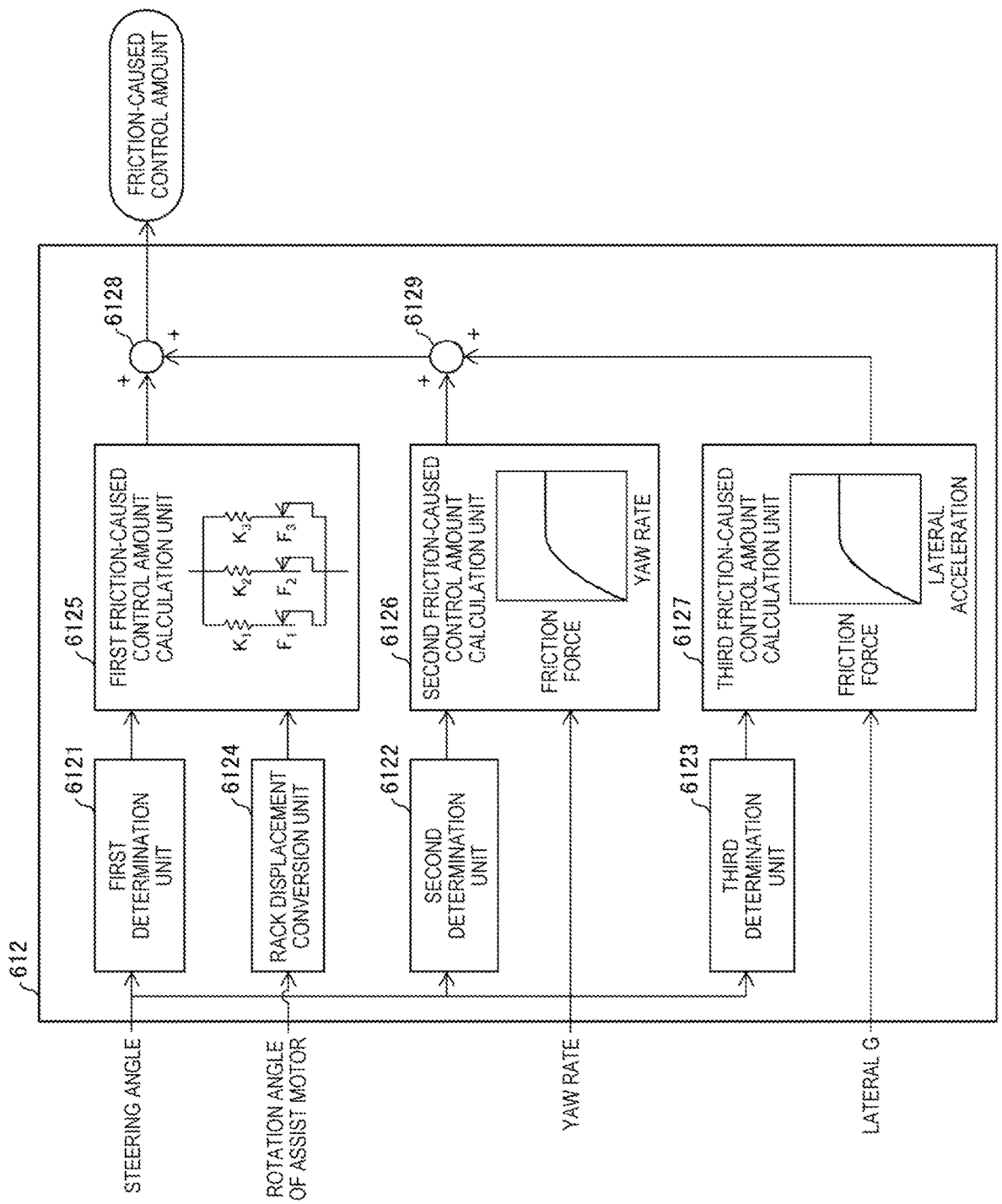
FIG. 4 is a block diagram showing a configuration example of a friction force calculation unit according to the first embodiment of the present invention.

Here, a configuration of the friction force calculation unit 612 will be described in more detail with reference to FIG. 4. FIG. 4 is a block diagram showing a configuration example of the friction force calculation unit 612. FIG. 4 shows, as an example, a case where the steering angle supplied from the steering angle sensor 440 is used as the steering angle-related value.

As shown in FIG. 4, the friction force calculation unit 612 includes a first determination unit 6121, a second determination unit 6122, a third determination unit 6123, a rack displacement conversion unit 6124, a first friction-caused control amount calculation unit 6125, a second friction-caused control amount calculation unit 6126, a third friction-caused control amount calculation unit 6127, an addition unit 6128, and an addition unit 6129.

The first determination unit 6121 determines whether to cause the first friction-caused control amount calculation unit 6125 to calculate the friction-caused control amount according to the supplied steering angle-related value. More specifically, when the first determination unit 6121 determines that the supplied steering angle-related value is included in the above first range, the first determination unit 6121 causes the first friction-caused control amount calculation unit 6125 to calculate the friction-caused control amount.

The second determination unit 6122 determines whether to cause the second friction-caused control amount calculation unit 6126 to calculate the friction-caused control amount according to the supplied steering angle-related value. More specifically, when the second determination unit 6122 determines that the supplied steering angle-related value is included in the above second range, the second determination unit 6122 causes the second friction-caused control amount calculation unit 6126 to calculate the friction-caused control amount.

The third determination unit 6123 determines whether to cause the third friction-caused control amount calculation unit 6127 to calculate the friction-caused control amount according to the supplied steering angle-related value. More specifically, when the third determination unit 6123 determines that the supplied steering angle-related value is included in the above third range, the third determination unit 6123 causes the third friction-caused control amount calculation unit 6127 to calculate the friction-caused control amount.

The rack displacement conversion unit 6124 calculates the rack position based on the rotation angle of the assist motor supplied from the resolver 625. The rack displacement conversion unit 6124 supplies the calculated rack position to the first friction-caused control amount calculation unit 6125.

The first friction-caused control amount calculation unit 6125 stores a friction model that calculates a friction force in accordance with the rack position and that is a friction model in which a spring component K and a Coulomb friction component F are coupled in series. When the first determination unit 6121 determines that the steering angle-related value is within the first range, the first friction-caused control amount calculation unit 6125 calculates the friction force in accordance with the rack position supplied from the rack displacement conversion unit 6124 using the friction model. The first friction-caused control amount calculation unit 6125 calculates a friction-caused control amount caused by the calculated friction force. The first friction-caused control amount calculation unit 6125 supplies the calculated friction-caused control amount to the addition unit 6128. The friction model in which the spring component K and the Coulomb friction component F are coupled in series will be described in detail later.

The second friction-caused control amount calculation unit 6126 stores a table (map) indicating a relation between the yaw rate and the friction force. When the second determination unit 6122 determines that the steering angle-related value is within the second range, the second friction-caused control amount calculation unit 6126 calculates the friction force in accordance with the yaw rate supplied from the yaw rate sensor 350 using the table. The second friction-caused control amount calculation unit 6126 calculates a friction-caused control amount caused by the calculated friction force. The second friction-caused control amount calculation unit 6126 supplies the calculated friction-caused control amount to the addition unit 6129. Here, the table indicating the relation between the yaw rate and the friction force is created using a friction model, for example. The friction-caused control amount may be calculated using a friction model that derives the friction force from the yaw rate.

The third friction-caused control amount calculation unit 6127 stores a table (map) indicating a relation with the friction force in accordance with the lateral acceleration. When the third determination unit 6123 determines that the steering angle-related value is within the third range, the third friction-caused control amount calculation unit 6127 calculates the friction force in accordance with the lateral acceleration supplied from the lateral G sensor 330 using the table. The third friction-caused control amount calculation unit 6127 calculates a friction-caused control amount caused by the calculated friction force. The third friction-caused control amount calculation unit 6127 supplies the calculated friction-caused control amount to the addition unit 6129. Here, the table indicating the relation between the lateral acceleration and the friction force is created using a friction model, for example. The friction-caused control amount may be calculated using a friction model that derives the friction force from the lateral acceleration.

The addition unit 6129 adds the friction-caused control amount acquired from the second friction-caused control amount calculation unit 6126 and the friction-caused control amount acquired from the third friction-caused control amount calculation unit 6127, and supplies the calculated friction-caused control amount to the addition unit 6128.

The addition unit 6128 adds the friction-caused control amount acquired from the first friction-caused control amount calculation unit 6125 and the friction-caused control amount acquired from the addition unit 6129, and supplies the calculated friction-caused control amount to the addition unit 615.

The configuration in which both the friction-caused control amount acquired from the second friction-caused control amount calculation unit 6126 and the friction-caused control amount acquired from the third friction-caused control amount calculation unit 6127 are used to calculate the friction-caused control amount has been described as an example, and the invention described in the present description is not limited thereto. The addition unit 6129 according to the present embodiment may be configured to acquire the friction-caused control amount from any one of the second friction-caused control amount calculation unit 6126 and the third friction-caused control amount calculation unit 6127 and supply the acquired friction-caused control amount to the addition unit 6129.

Here, the details of the friction model in which the spring component K and the Coulomb friction component F are coupled in series stored in the first friction-caused control amount calculation unit 6125 will be described. The friction model described in the first friction-caused control amount calculation unit 6125 of FIG. 4 is an example of a model in which the spring component K and the Coulomb friction component F used to calculate the friction force in accordance with the rack position are coupled in series. As shown in FIG. 4, the first friction-caused control amount calculation unit 6125 calculates the friction force using a plurality of models in which the spring component K and the Coulomb friction component F are coupled in series. The first friction-caused control amount calculation unit 6125 may calculate the friction force using, for example, a Masing Model in which a plurality of models are connected in parallel to each other, and the models have the spring component K and the Coulomb friction component F coupled in series.

The first friction-caused control amount calculation unit 6125 calculates the friction force in accordance with the rack position by creating a desirable friction force waveform in accordance with the rack displacement using a plurality of models in which the spring component K and the Coulomb friction component F are coupled in series, and calculates the friction-caused control amount caused by the calculated friction force.

FIG. 4 shows an example of a Masing Model in which three models, a model in which a spring component $K_1$ and a Coulomb friction component $F_1$ are coupled in series, a model in which a spring component $K_2$ and a Coulomb friction component $F_2$ are coupled in series, and a model in which a spring component $K_3$ and a Coulomb friction component $F_3$ are coupled in series, are connected in parallel. The first friction-caused control amount calculation unit 6125 is not limited thereto, and may calculate the friction force using a large number of such models, such as ten or more, for example.

In the plurality of models, a ratio between a spring constant of the respective spring components $K_1$, $K_2$, and $K_3$ and a Coulomb friction force of the respective Coulomb friction components $F_1$, $F_2$, and $F_3$ is different for each of the models. The ratios $F_1/K_1$, $F_2/K_2$, and $F_3/K_3$ between the spring constants and the Coulomb friction forces of the models are set so as to satisfy a relation of $F_1/K_1 < F_2/K_2 < F_3/K_3$, for example. The ratios $F_1/K_1$, $F_2/K_2$, and $F_3/K_3$ between the spring constants and the Coulomb friction forces of the models can be freely set in consideration of an ideal friction force waveform output by driving these models. The first friction-caused control amount calculation unit 6125 outputs, according to the rack position, a current proportional to a friction force signal output by driving a model in which the spring components $K_{1-3}$ and the Coulomb friction components $F_{1-3}$ are coupled in series to the addition unit 6129 as the friction-caused control amount.

Figure 5:
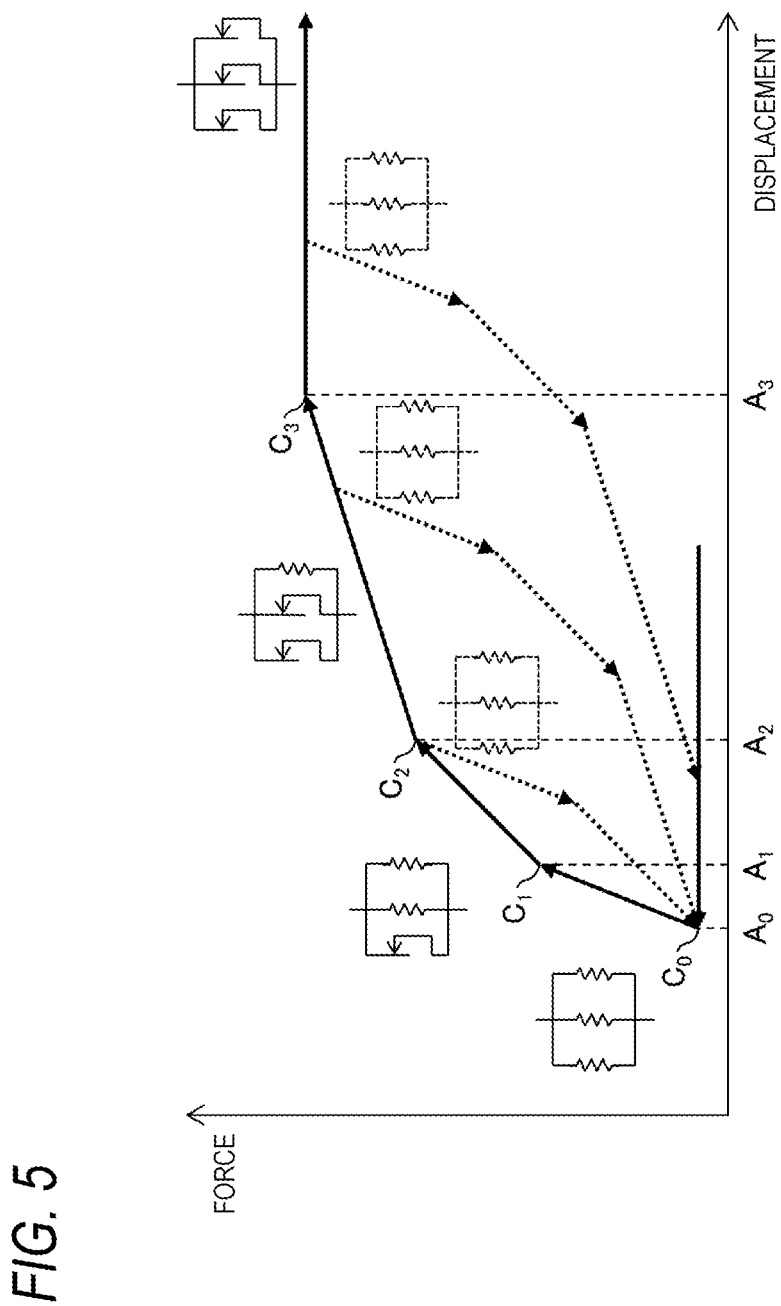
FIG. 5 is a diagram showing a steering control amount by the steering control unit according to the first embodiment of the present invention.

FIG. 5 is a diagram showing a friction force waveform created using the model in which the spring components $K_{1-3}$ and the Coulomb friction components $F_{1-3}$ are coupled in series. As shown in FIG. 5, the first friction-caused control amount calculation unit 6125 fixes all models of the Coulomb friction components between a rack position $A_0$ and a rack position $A_1$ immediately after the rack position indicates that the steering member 410 is reversed. As a result, a friction force waveform in which the friction force increases from $C_0$ to $C_1$ is achieved. The increase of the friction force from $C_0$ to $C_1$ is an increase of a steep angle as compared with an increase from $C_1$ to $C_2$ and an increase from $C_2$ to $C_3$, which will be described later.

Next, between the rack position $A_1$ and a rack position $A_2$, the first friction-caused control amount calculation unit 6125 slides the model in which the spring component $K_1$ and the Coulomb friction component $F_1$, which have the smallest ratio between the spring constant and the Coulomb friction force among the three ratios, are coupled in series. As a result, a friction force waveform in which the friction force increases more gently from $C_1$ to $C_2$ than from $C_0$ to $C_1$ is achieved.

Next, between the rack position $A_2$ and a rack position $A_3$, the first friction-caused control amount calculation unit 6125 slides the model in which the spring component $K_1$ the Coulomb friction component $F_1$, which have the smallest ratio between the spring constant and the Coulomb friction force among the three ratios, are coupled in series, and slides the model in which the spring component $K_2$ and the Coulomb friction component $F_2$, which have a ratio between the spring constant and the Coulomb friction force in the middle of the three ratios, are coupled in series. As a result, a friction force waveform in which the friction force increases even more gently from $C_2$ to $C_3$ than from $C_1$ to $C_2$ is achieved. Here, in other words, the first friction-caused control amount calculation unit 6125 outputs the friction-caused control amounts output by coupling a plurality of spring components K and the Coulomb friction components F in series in ascending order of the ratio between the spring component and the Coulomb friction force in the model.

Finally, the first friction-caused control amount calculation unit 6125 slides all of the plurality of models in which the spring components $K_{1-3}$ and the Coulomb friction components $F_{1-3}$ are connected in series. As a result, the friction force is maintained at the constant value $C_3$.

In this way, by sliding the plurality of models in which the spring component K and the Coulomb friction component F are coupled in series in ascending order of the ratio between the spring constant and the Coulomb friction force in the model, the first friction-caused control amount calculation unit 6125 achieves a friction force waveform in which the friction force gently increases. By increasing the number of models in which the spring component K and the Coulomb friction component F are coupled in series, which are used by the first friction-caused control amount calculation unit 6125, it is possible to create a friction force waveform in which the friction force increases further smoothly.

When the friction force is calculated by using a plurality of models in which the spring component K and the Coulomb friction component F are coupled in series, the friction force waveform follows point-symmetrical paths between a forward path and a backward path of the steering member 410 and is directed to the previous reversal point. Therefore, the first friction-caused control amount calculation unit 6125 can achieve an ideal friction force waveform by using a plurality of models in which the spring component K and the Coulomb friction component F are coupled in series without detecting whether the steering member 410 is the forward path or the backward path.

Here, the ideal friction force waveform can be achieved by further considering at least one of the yaw rate and the lateral acceleration in addition to the rack position. As such a method, for example, there is a method in which the friction force in accordance with the rack position is calculated using a plurality of models in which the spring component K and the Coulomb friction components F are coupled in series, and at least one or both of a friction force component calculated according to the yaw rate and a friction force component calculated according to the lateral acceleration are added to the friction force. As another method, in a plurality of models in which the spring component K and the Coulomb friction component F are coupled in series, some models in which the spring component K and the Coulomb friction component F are coupled in series are used to calculate the friction force in accordance with the rack position, and other models in which the spring component K and the Coulomb friction component F are coupled in series are used to calculate the friction force in accordance with the yaw rate, the lateral acceleration, or both. By achieving a friction force waveform with such a method, it is possible to implement control that provides a more comfortable driving feeling for the driver. In other words, the friction force calculation unit 612 according to the present embodiment can form a hysteresis shape in consideration of the yaw rate or the lateral acceleration or a hysteresis shape in consideration of the yaw rate and the lateral acceleration in a relation between the rack position and the friction force, and calculate the friction force based on the hysteresis shape.

In this case, a connection between the friction-caused control amounts calculated by the first friction-caused control amount calculation unit 6125 and the second friction-caused control amount calculation unit 6126, a connection between the friction-caused control amounts calculated by the first friction-caused control amount calculation unit 6125 and the third friction-caused control amount calculation unit 6127, or a connection between the friction-caused control amounts calculated by the first friction-caused control amount calculation unit 6125, the second friction-caused control amount calculation unit 6126, and the third friction-caused control amount calculation unit 6127 has a hysteresis shape in the relation between the rack displacement and the force.

The value calculated by the first friction-caused control amount calculation unit 6125 using the above models has hysteresis in a relation between the steering angle-related value and the friction-caused control amount. The first friction-caused control amount calculation unit 6125 may have in advance a hysteresis map indicating the relation between the steering angle-related value and the friction-caused control amount calculated in advance using the above models. The first friction-caused control amount calculation unit 6125 may calculate the friction-caused control amount using the acquired steering angle-related value and the hysteresis map.

The first friction-caused control amount calculation unit 6125 can calculate the friction force using a friction model other than the above Masing Model. Examples of the friction model other than the Masing Mode include a Maxwell model, a Dahl model, a Lugre model, and the like, and a model obtained by combining various friction models can also be used. In the case of the Maxwell model, the friction force can be calculated by serial coupling of a rigid component and a damping component. A designer can freely create a waveform desired by the designer using these friction models.

Figure 6A:
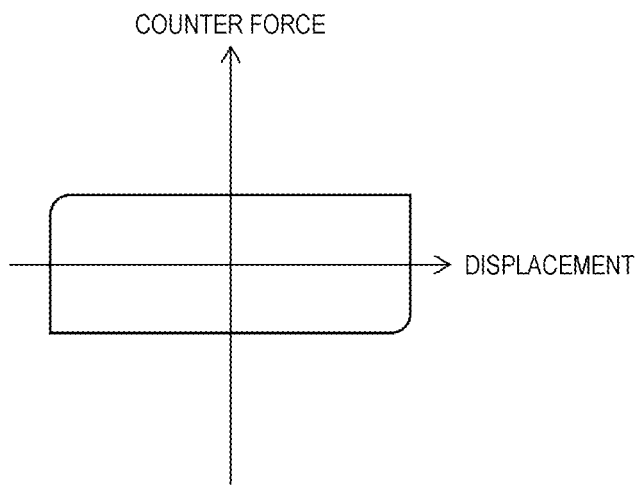
FIG. 6A is a diagram showing a steering counter force when steering control is performed using only a basic control amount.

FIG. 6A is a diagram showing a steering counter force when steering control is performed using only the basic control amount calculated by the basic control amount calculation unit 611.

Figure 6B:
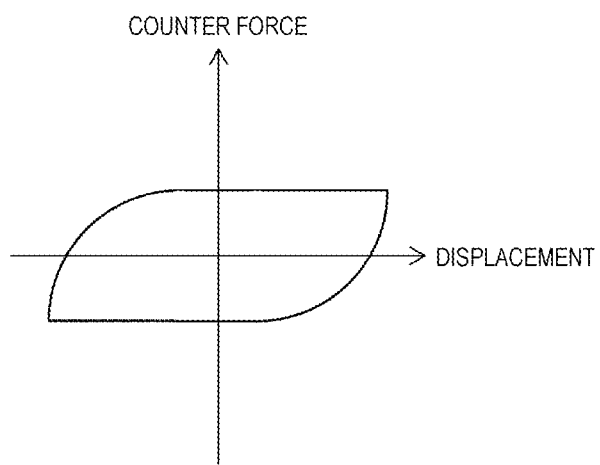
FIG. 6B is a diagram showing a steering counter force when steering control is performed using only a friction-caused control amount.

FIG. 6B is a diagram showing a steering counter force when steering control is performed using only the friction-caused control amount calculated by the friction force calculation unit 612.

Figure 6C:
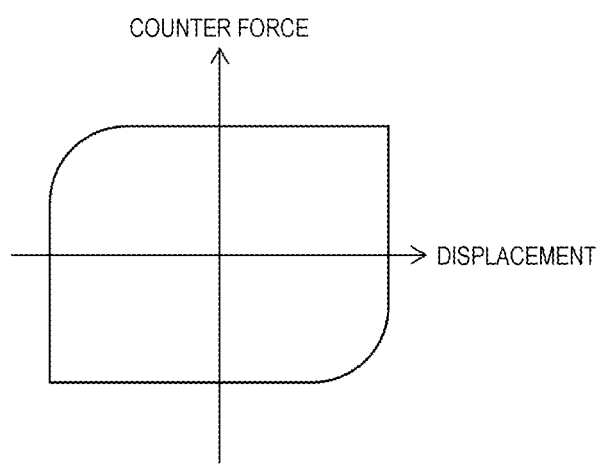
FIG. 6C is a diagram showing a steering counter force when steering control is performed using a steering control amount calculated by an addition unit.

FIG. 6C is a diagram showing a steering counter force when steering control is performed using the steering control amount calculated by the addition unit 615.

In this way, the steering control unit 610 controls the steering device with the steering control amount obtained by adding the friction-caused control amount to the basic control amount calculated by the basic control amount calculation unit 611. The friction-caused control amount is caused by the friction force calculated by the friction force calculation unit 612 using a plurality of models in which the spring component K and the Coulomb friction component F are coupled in series. Therefore, the friction force can increase smoothly in an initial stage of steering, which facilitates a minute steering operation. Since there is a clear change in a steering force with respect to a minute change in the steering angle, the minute change in the steering angle can be perceived from the feeling of hands, and the steering feeling is improved.

Second Embodiment

In the first embodiment, the configuration in which the steering control unit 610 uses a yaw rate and a lateral acceleration supplied from sensors provided in the vehicle 900 when the friction force calculation unit 612 calculates a friction force has been described as an example, and the invention described in the present description is not limited thereto. A steering control unit 610a according to the present embodiment further includes a vehicle model calculation unit 613 that calculates a vehicle model in addition to the configuration of the first embodiment. For convenience of description, members having the same functions as those described in the above embodiment are denoted by the same reference numerals, and description thereof will not be repeated.

Figure 7:
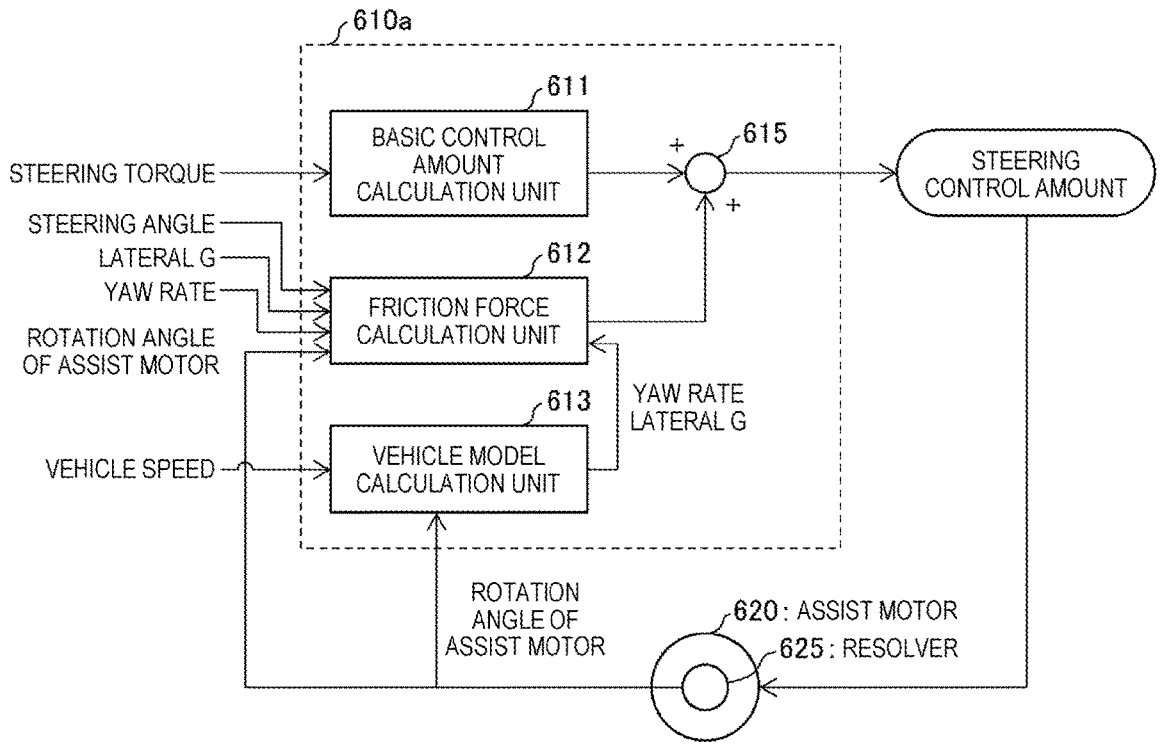
FIG. 7 is a block diagram showing a configuration example of a steering control unit according to a second embodiment of the present invention.

FIG. 7 is a block diagram showing a configuration example of the steering control unit 610a according to the present embodiment.

As shown in FIG. 7, the steering control unit 610a is different from the steering control unit 610 described in the first embodiment in the following points.

That is, the steering control unit 610a includes the vehicle model calculation unit 613. In the present embodiment, the basic control amount calculation unit 611, the friction force calculation unit 612, the vehicle model calculation unit 613, and the addition unit 615 are collectively referred to as a steering control amount calculation unit.

The vehicle model calculation unit 613 stores a vehicle model of the vehicle 900, and calculates a yaw rate and a lateral acceleration of the vehicle 900 by inputting a vehicle speed supplied via the CAN 370 and a rotation angle of an assist motor supplied from the resolver 625 to the vehicle model. The vehicle model calculation unit 613 supplies the calculated yaw rate and lateral acceleration to the friction force calculation unit 612. Here, the vehicle model calculation unit 613 may be configured to calculate a rack position with reference to a rotation angle signal of the assist motor acquired from the resolver 625. In this case, the vehicle model calculation unit 613 calculates the yaw rate and the lateral acceleration of the vehicle 900 by inputting the vehicle speed supplied via the CAN 370 and the calculated rack position to the vehicle model. The friction force calculation unit 612 calculates a friction-caused control amount of the second friction-caused control amount calculation unit 6126 using the calculated yaw rate, and calculates a friction-caused control amount of the third friction-caused control amount calculation unit 6127 using the calculated lateral acceleration. As a result, in the steering control unit 610a according to the present embodiment, since all of the first friction-caused control amount calculation unit 6125, the second friction-caused control amount calculation unit 6126, and the third friction-caused control amount calculation unit 6127 can calculate the friction-caused control amount using source input as the rack position, at the timing at which a signal used for calculating the friction-caused control amount is displaced, a hysteresis shape using a Masing Model having a better connection can also be reproduced.

The friction force calculation unit 612 calculates a friction force according to at least one of the yaw rate and the lateral acceleration supplied from the vehicle model calculation unit 613. As described above, the friction force calculation unit 612 according to the present embodiment can calculate the friction force after estimating the yaw rate and the lateral acceleration occurring in the vehicle 900, and calculate the friction-caused control amount caused by the friction force. As a result, the steering control unit 610a according to the present embodiment can accurately operate a counter force according to conditions of a vehicle, and the steering feeling is improved.

Third Embodiment

In the first embodiment, the configuration in which the steering control unit 610 calculates a steering control amount according to a basic control amount in accordance with a steering amount and a friction-caused control amount calculated by the friction force calculation unit 612 has been described as an example, and the invention described in the present description is not limited thereto. In addition to the configuration of the first embodiment, a steering control unit 610b according to the present embodiment further includes an existing friction cancellation amount calculation unit 614 that calculates a friction cancellation control amount for cancelling friction of an electric power steering device. The steering control unit 610b calculates a steering control amount according to a basic control amount, a friction-caused control amount, and the friction cancellation control amount calculated by the existing friction cancellation amount calculation unit 614. Here, the steering control unit 610b of the present embodiment may further include the vehicle model calculation unit 613 of the second embodiment. In the following description, the configuration of the steering control unit 610b that does not include the vehicle model calculation unit 613 will be described. For convenience of description, members having the same functions as those described in the above embodiments are denoted by the same reference numerals, and description thereof will not be repeated.

Figure 8:
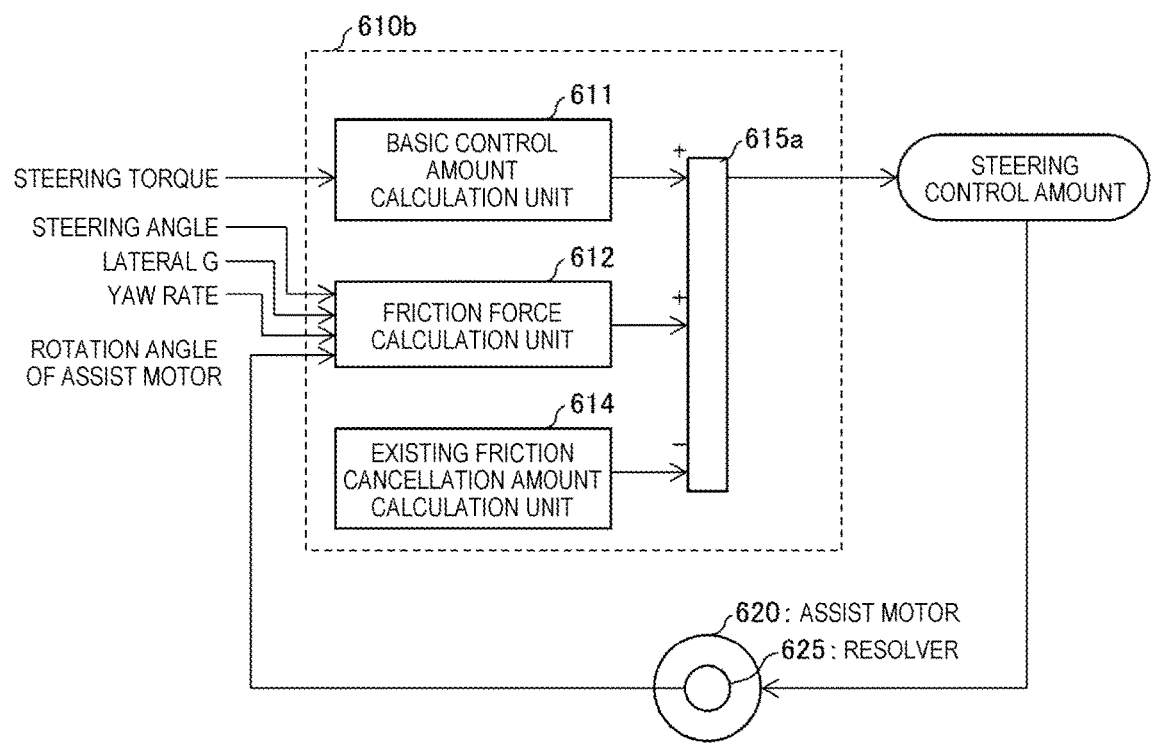
FIG. 8 is a block diagram showing a configuration example of a steering control unit according to a third embodiment of the present invention.

FIG. 8 is a block diagram showing a configuration example of the steering control unit 610b according to the present embodiment.

As shown in FIG. 8, the steering control unit 610b is different from the steering control unit 610 described in the first embodiment in the following points.

That is, the steering control unit 610b includes the existing friction cancellation amount calculation unit 614. In the present embodiment, the basic control amount calculation unit 611, the friction force calculation unit 612, the existing friction cancellation amount calculation unit 614, and a calculation unit 615a are collectively referred to as a steering control amount calculation unit.

The existing friction cancellation amount calculation unit 614 calculates a friction amount of a steering device, that is, a friction amount in accordance with existing friction characteristics of mechanical components such as the steering member 410, the steering shaft 420, the torque application unit 460, the rack-and-pinion mechanism 470, and the rack shaft 480.

The existing friction cancellation amount calculation unit 614 calculates an existing friction amount according to at least one of a steering angle of the steering member 410 detected by the steering angle sensor 440 and a steering torque detected by the torque sensor 430 and generated in the steering member 410 when the steering device is steered.

Here, when the steering angle is used to calculate the existing friction amount, the steering angle may be calculated using a motor rotation angle calculated by the resolver 625 and the steering torque detected by the torque sensor 430. Specifically, a correction angle calculated based on the steering torque can be added to the motor rotation angle to obtain the steering angle. In this case, the correction angle calculated based on the steering torque can be calculated by multiplying the detected steering torque by a predetermined coefficient (for example, a reciprocal of a spring rate of a torsion bar). As a result, even without the steering angle sensor 440, it is possible to accurately determine the steering angle and calculate the existing friction amount.

The existing friction cancellation amount calculation unit 614 calculates, based on the calculated existing friction amount, a friction cancellation control amount for subtracting (cancelling) the existing friction amount from a final steering control amount.

The calculation unit 615a calculates a steering control amount by subtracting the friction cancellation control amount calculated by the existing friction cancellation amount calculation unit 614 from the sum of the basic control amount and the friction-caused control amount. The steering control amount calculated by the calculation unit 615a is supplied to the assist motor 620 of the torque application unit 460.

Figure 9A:
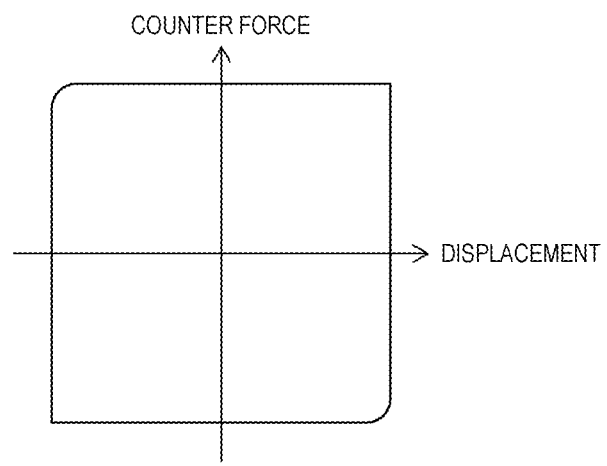
FIG. 9A is a diagram showing a steering counter force when steering control is performed using only a basic control amount.

FIG. 9A is a diagram showing a steering counter force when steering control is performed using only the basic control amount calculated by the basic control amount calculation unit 611.

Figure 9B:
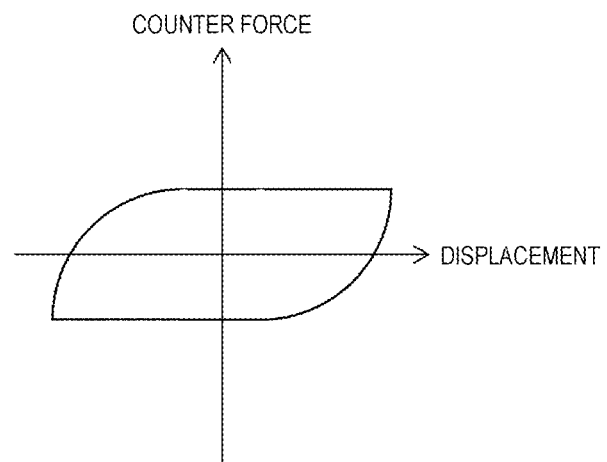
FIG. 9B is a diagram showing a steering counter force when steering control is performed using a steering control amount calculated by a calculation unit.

FIG. 9B is a diagram showing a steering counter force when steering control is performed using the steering control amount calculated by the calculation unit 615a.

According to the above configuration, the steering control unit 610b calculates the steering control amount by subtracting the friction cancellation control amount from the sum of the basic control amount and the friction-caused control amount. Therefore, the steering control unit 610b can calculate a desirable steering control amount in accordance with the friction characteristics of the mechanical components of the electric power steering device.

Fourth Embodiment

In the third embodiment, the configuration in which the steering control unit 610b calculates a steering control amount by subtracting a friction cancellation control amount from the sum of a basic control amount and a friction-caused control amount has been described as an example, and the invention described in the present description is not limited thereto. A steering control unit 610c according to the present embodiment includes a calculation unit (correction control amount calculation unit) 616 instead of the calculation unit 615a in the configuration of the third embodiment. The steering control unit 610c outputs a basic control amount calculated by the basic control amount calculation unit 611 and a correction control amount obtained by subtracting a friction-caused control amount from a friction cancellation control amount. Here, the steering control unit 610c of the present embodiment may further include the vehicle model calculation unit 613 of the second embodiment. In the following description, the configuration of the steering control unit 610c that does not include the vehicle model calculation unit 613 will be described. For convenience of description, members having the same functions as those described in the first and second embodiments are denoted by the same reference numerals, and description thereof will not be repeated.

Figure 10:
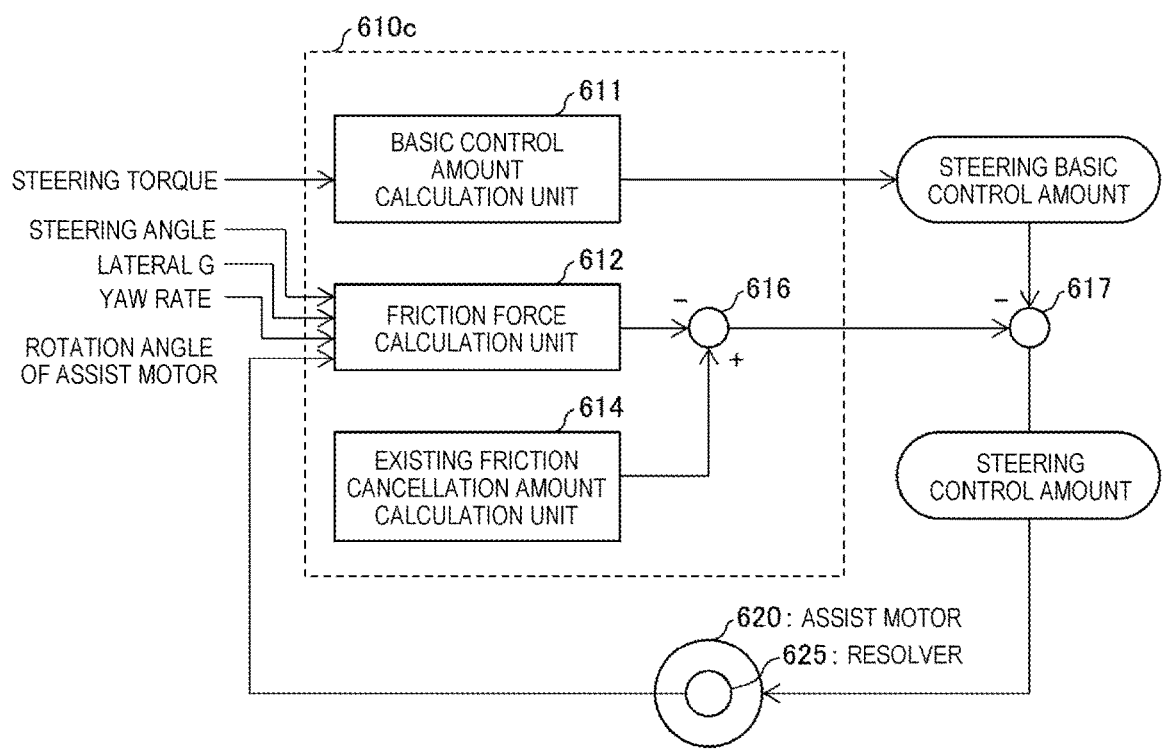
FIG. 10 is a block diagram showing a configuration example of a steering control unit according to a fourth embodiment of the present invention.

FIG. 10 is a block diagram showing a configuration example of the steering control unit 610c according to the present embodiment.

As shown in FIG. 10, the steering control unit 610c is different from the steering control unit 610b described in the third embodiment in the following points.

That is, the steering control unit 610c does not include the calculation unit 615a but includes the calculation unit 616.

The calculation unit 616 calculates a correction control amount by subtracting a friction-caused control amount calculated by the friction force calculation unit 612 from a friction cancellation control amount calculated by the existing friction cancellation amount calculation unit 614.

The correction control amount calculated by the calculation unit 616 is subtracted from the basic control amount calculated by the basic control amount calculation unit 611 in a subtraction unit 617.

In the present embodiment, the basic control amount calculation unit 611, the friction force calculation unit 612, the existing friction cancellation amount calculation unit 614, the calculation unit 616, and the subtraction unit 617 are collectively referred to as a steering control amount calculation unit. A control amount calculation unit calculates a steering control amount by subtracting the correction control amount from the basic control amount.

Figure 11:
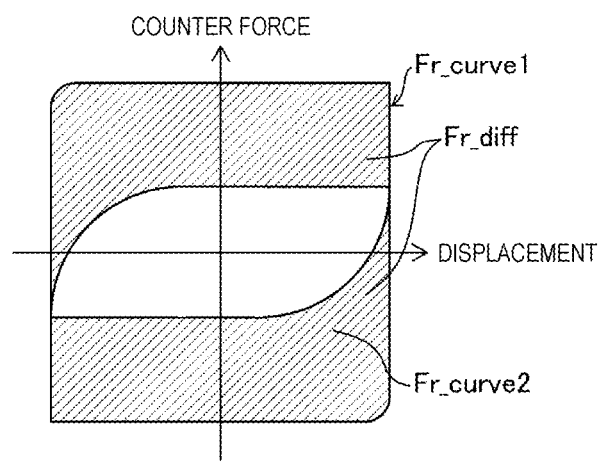
FIG. 11 is a diagram showing a steering control amount by a steering control unit according to a fourth embodiment of the present invention.

FIG. 11 is a diagram showing a waveform of the steering control amount calculated by the control amount calculation unit. In FIG. 11, Fr_curve1 indicates a waveform of a steering counter force when steering control is performed using the basic control amount calculated by the basic control amount calculation unit 611, and Fr_curve2 indicates a waveform of a steering counter force when steering control is performed using an ideal steering control amount. Fr_diff indicates a difference between the ideal steering counter force and the steering counter force when the basic control amount is used.

The correction control amount calculated by the calculation unit 616 subtracting the friction-caused control amount from the friction cancellation control amount corresponds to Fr_diff. As shown in FIG. 11, the control amount calculation unit calculates a desirable steering control amount (corresponding to Fr_curve2) by subtracting the correction control amount (corresponding to Fr_diff) calculated by the calculation unit 616 from the basic control amount (corresponding to Fr_curve1) calculated by the basic control amount calculation unit 611.

The control amount calculation unit supplies the calculated steering control amount to the assist motor 620 of the torque application unit 460.

According to these configurations, the control amount calculation unit calculates the correction control amount by subtracting the friction-caused control amount from the friction cancellation control amount, and calculates the steering control amount by subtracting the calculated correction control amount from the basic control amount. As a result, a friction force can increase smoothly, and the influence of vibration disturbance in the calculation of the steering control amount can be prevented. Therefore, when a steering operation of slightly increasing a steering angle/returning a steering wheel is repeated, a slight change in the steering angle can be perceived from the feeling of hands, and the steering feeling is improved.

Fifth Embodiment

In the fifth embodiment, in the electric power steering devices described in the first, second, and third embodiments, a configuration in which the flexibility of a friction portion of a mechanical component is further increased to improve the steering feeling will be described. The configuration of the fifth embodiment can be applied to any of the first, second, and third embodiments.

Figure 12:
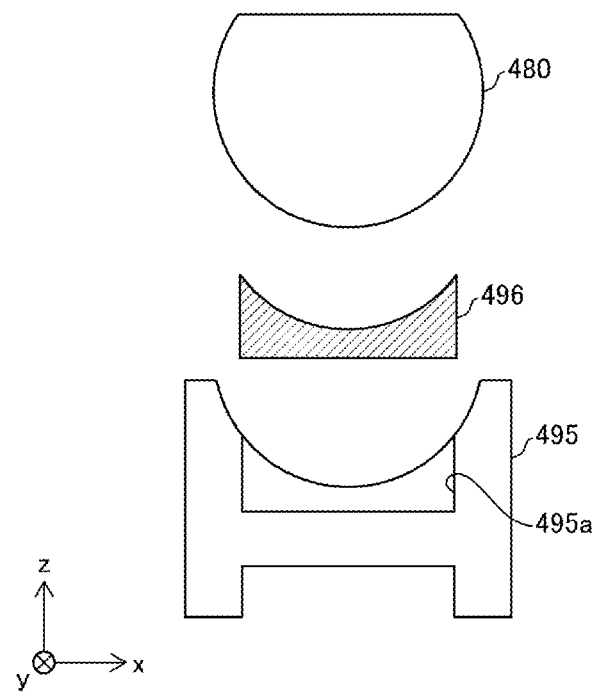
FIG. 12 is a diagram showing a friction portion of a mechanical component according to a fifth embodiment of the present invention.

FIG. 12 is a diagram showing the rack shaft 480 and a rack guide 495, which are examples of the friction portion of the mechanical component in the electric power steering device. As shown in FIG. 12, a resin bearing 496 is disposed between the rack shaft 480 and the rack guide 495. A recessed portion 495a is formed in the rack guide 495 along an extending direction of the rack shaft, and the resin bearing 496 is fitted into the recessed portion.

In FIG. 12, a y-axis direction indicates a direction in which the rack shaft 480 extends, a z-axis indicates a vertical direction perpendicular to the y-axis, and an x-axis indicates a direction perpendicular to the y-axis and the z-axis.

As shown in FIG. 12, by increasing the flexibility of the resin bearing 496 by the resin bearing 496 having a thickness (thickness along the z-axis direction), a friction force when the rack shaft 480 starts to slide against a counter torque smoothly increases due to the distortion of the resin bearing 496.

As shown in FIG. 12, it is preferable to change the thickness (thickness along the z-axis direction) of the resin bearing 496 along the x-axis direction. As a result, the amount of distortion until the rack shaft starts to slide with respect to the counter torque can be differentiated depending on each position of the resin bearing 496, and the friction force smoothly increases in a curve shape rather than stepwise.

In addition to the friction portion between the rack shaft 480 and the rack guide 495, in friction portions of various mechanical components in the electric power steering device, by increasing a thickness of a resin bearing and further making the thickness uneven, the friction force due to a steering operation in the electric power steering device can increase smoothly, and the steering feeling can be improved.

[Implementation Example by Software]

A control block (steering control unit 610) of the ECU 600 may be implemented by a logic circuit (hardware) formed in an integrated circuit (IC chip) or the like, or may be implemented by software using a central processing unit (CPU).

In the latter case, the ECU 600 includes a CPU that executes instructions of a program that is software implementing each function, a read only memory (ROM) or a storage device (referred to as a "recording medium") in which the program and various types of data are recorded so that they can be read by a computer (or a CPU), a random access memory (RAM) in which the program is deployed, and the like. The object of the present invention is achieved by a computer (or a CPU) reading the program from the recording medium and executing the program. Examples of the recording medium include "a non-transitory tangible medium" such as a tape, a disk, a card, a semiconductor memory, and a programmable logic circuit. The program may be supplied to the computer via any transmission medium (such as a communication network or a broadcast wave) capable of transmitting the program. The present invention can also be implemented in a form of a data signal embedded in a carrier wave in which the program is embodied by electronic transmission.

The present invention is not limited to the embodiments described above, various modifications can be made within the scope of the claims, and embodiments obtained by appropriately combining technical means disclosed in different embodiments are also included in the technical scope of the present invention.

What is claimed is:

1. An electric power steering control device for calculating a steering control amount for steering a steering device, the electric power steering control device comprising:
    a basic control amount calculation unit configured to calculate a basic control amount in accordance with steering by a driver;
    a friction force calculation unit configured to calculate a friction force in accordance with at least one of a yaw rate and lateral acceleration using a friction model, and calculate a friction-caused control amount caused by the calculated friction force; and
    a control amount calculation unit configured to calculate the steering control amount according to the basic control amount and the friction-caused control amount calculated by the friction force calculation unit.

2. The electric power steering control device according to claim 1, wherein
    the friction force calculation unit is configured to calculate the friction force in accordance with the yaw rate and the friction force in accordance with the lateral acceleration, and calculate the friction-caused control amount caused by the calculated friction force in accordance with the yaw rate and the friction force in accordance with the lateral acceleration.

3. The electric power steering control device according to claim 2, wherein the friction force calculation unit is configured to calculate the friction force further in accordance with a steering angle-related value which is a value related to a steering angle of a steering device, and calculate the friction-caused control amount caused by the calculated friction force.

4. The electric power steering control device according to claim 3, wherein the friction force calculation unit is configured to calculate the friction-caused control amount based on the friction force in accordance with the steering angle-related value and the friction force in accordance with the yaw rate.

5. The electric power steering control device according to claim 3, wherein the friction force calculation unit is configured to calculate the friction-caused control amount based on the friction force in accordance with the steering angle-related value and the friction force in accordance with the lateral acceleration.

6. The electric power steering control device according to claim 3, wherein the friction force calculation unit is configured to select, according to the steering angle-related value, a signal value to be used for calculation of the friction-caused control amount, and the friction force calculation unit is configured to calculate a friction-caused control amount based on the friction force in accordance with the steering angle-related value when the steering angle-related value is included in a first range, calculate a friction-caused control amount based on the friction force in accordance with the yaw rate when the steering angle-related value is included in a second range larger than the first range, and calculate a friction-caused control amount based on the friction force in accordance with the lateral acceleration when the steering angle-related value is included in a third range larger than the second range.

7. The electric power steering control device according to claim 3, wherein the steering angle-related value is calculated from a motor rotation angle signal of an electric motor that applies an assist torque or a counter force torque to the steering device based on a steering control amount calculated by a control amount calculation unit.

8. The electric power steering control device according to claim 2, wherein the friction model is a model in which a spring component and a Coulomb friction component are coupled in series, and the friction force calculation unit is configured to calculate the friction force using the model in which the spring component and the Coulomb friction component are coupled in series.

9. The electric power steering control device according to claim 1, wherein the friction force calculation unit is configured to calculate the friction force further in accordance with a steering angle-related value which is a value related to a steering angle of a steering device, and calculate the friction-caused control amount caused by the calculated friction force.

10. The electric power steering control device according to claim 9, wherein the friction force calculation unit is configured to calculate the friction-caused control amount based on the friction force in accordance with the steering angle-related value and the friction force in accordance with the yaw rate.

11. The electric power steering control device according to claim 9, wherein the friction force calculation unit is configured to calculate the friction-caused control amount based on the friction force in accordance with the steering angle-related value and the friction force in accordance with the lateral acceleration.

12. The electric power steering control device according to claim 9, wherein the friction force calculation unit is configured to select, according to the steering angle-related value, a signal value to be used for calculation of the friction-caused control amount, and the friction force calculation unit is configured to calculate a friction-caused control amount based on the friction force in accordance with the steering angle-related value when the steering angle-related value is included in a first range, calculate a friction-caused control amount based on the friction force in accordance with the yaw rate when the steering angle-related value is included in a second range larger than the first range, and calculate a friction-caused control amount based on the friction force in accordance with the lateral acceleration when the steering angle-related value is included in a third range larger than the second range.

13. The electric power steering control device according to claim 9, wherein the steering angle-related value is calculated from a motor rotation angle signal of an electric motor that applies an assist torque or a counter force torque to the steering device based on a steering control amount calculated by a control amount calculation unit.

14. The electric power steering control device according to claim 1, wherein the friction model is a model in which a spring component and a Coulomb friction component are coupled in series, and the friction force calculation unit is configured to calculate the friction force using the model in which the spring component and the Coulomb friction component are coupled in series.

15. The electric power steering control device according to claim 14, wherein the friction force calculation unit is configured to calculate the friction force using a plurality of models each in which the spring component and the Coulomb friction component are coupled in series, each of the plurality of models has a spring constant and a Coulomb friction force, and, a ratio between the Coulomb friction force and the spring constant is different for each of the plurality of models.

16. The electric power steering control device according to claim 1, further comprising:
an existing friction cancellation amount calculation unit configured to calculate a friction cancellation control amount for cancelling friction of the steering device, wherein
the control amount calculation unit is configured to calculate the steering control amount according to the basic control amount, the friction-caused control amount, and the friction cancellation control amount.

17. The electric power steering control device according to claim 16, wherein
the control amount calculation unit is configured to calculate the steering control amount by subtracting the friction cancellation control amount from a sum of the basic control amount and the friction-caused control amount.

18. The electric power steering control device according to claim 16, wherein
the control amount calculation unit is configured to calculate a correction control amount by subtracting the friction-caused control amount from the friction cancellation control amount, and calculate the steering control amount by subtracting the correction control amount from the basic control amount.

19. The electric power steering control device according to claim 16, wherein
the existing friction cancellation amount calculation unit is configured to calculate the friction cancellation control amount according to a steering torque generated when the steering device is steered.

20. An electric power steering device comprising the electric power steering control device according to claim 1.

* * * * *